United States Patent
Satoh et al.

(10) Patent No.: US 6,374,052 B1
(45) Date of Patent: Apr. 16, 2002

(54) CAMERA

(75) Inventors: Kazuhiro Satoh, Sagamihara; Hirohide Fukazawa, Hachioji; Akira Kasai; Kazuo Akai, both of Kyoto; Nobuharu Namikawa, Takatsuki; Jun Inoue, Akiruno, all of (JP)

(73) Assignee: Olympus Optical Co., Ltd. (JP)

( * ) Notice: Subject to any disclaimer, the term of this patent is extended or adjusted under 35 U.S.C. 154(b) by 73 days.

(21) Appl. No.: 09/621,362

(22) Filed: Jul. 21, 2000

(30) Foreign Application Priority Data

Jul. 30, 1999 (JP) ........................................... 11-217553
Jul. 30, 1999 (JP) ........................................... 11-217556

(51) Int. Cl.[7] ............................................. G03B 17/00
(52) U.S. Cl. ...................... 396/213; 396/287; 396/299; 396/424; 396/502
(58) Field of Search ............................. 396/245, 213, 396/297, 299, 424, 420, 502, 503, 76, 103, 287; 348/376, 373

(56) References Cited

U.S. PATENT DOCUMENTS

| | | | | |
|---|---|---|---|---|
| 3,048,092 A | * | 8/1962 | Gottschalk | 396/103 |
| 4,657,365 A | * | 4/1987 | Adelman | 396/502 X |
| 4,819,016 A | * | 4/1989 | Leonard et al. | 396/502 |
| 6,052,537 A | * | 4/2000 | Sasaki | 396/103 |

* cited by examiner

*Primary Examiner*—W. B. Perkey
(74) *Attorney, Agent, or Firm*—Straub & Pokotylo; John C. Pokotylo (57) ABSTRACT

To provide a camera configured to be supported by the hands of a photographer on the bottom surface of the body thereof whose operability is improved by allowing various settings to be easily made with the camera body supported reliably and allowing a set value to be stored and retrieved with a small number of operation members, a configuration is provided which includes a grip portion protruding in a direction orthogonal to an optical axis of a photographic optical system provided in a predetermined position of a lateral surface of the body of the camera and an operating member for allowing input of information to cause execution of a predetermined operation, the operating member being provided in the vicinity of the grip portion. There is further provided a setting member for setting a desired set value, a set value storing member for storing data representing desired set values which can be set with the setting member in advance, a set value retrieving member for arbitrarily reading the data stored in advance with the set value storing member instead of the set value set with the setting member and for setting a set value based on the same and control unit for controlling the set value storing member and the set value retrieving member such that they can be operated with a single operating member.

16 Claims, 3 Drawing Sheets

CAMERA

This application claims benefit of Japanese Application No. H11-217556 filed Jul. 30, 1999 and Japanese Application No. H11-217553 filed Jul. 30, 1999, the contents of which are incorporated by this reference.

BACKGROUND OF THE INVENTION

1. Field of the Invention

The present invention relates to cameras and, more particularly, to a camera having a configuration in which the bottom surface of the body of the camera is supported by the hands of a photographer and having functions of allowing a desired set value to be stored in advance and allowing the set value stored in advance to be retrieved and reset as needed.

2. Related Background Art

Conventional cameras for taking a picture by exposing a desired image of an object on a photographic film and electronic cameras which convert a desired image of an object into an electrical image signal using a pickup device or the like and record the signal as an electric signal in a predetermined form (hereinafter both types of cameras are collectively simply referred to as "cameras") include cameras configured to allow photographers to support the cameras with their own hands on the bottom surface thereof, for example, when the photographers take pictures with the cameras held in their hands, i.e., so-called hand-held shooting.

Specific examples of cameras with such a configuration include cameras utilizing a medium-sized roll of film, and camera bodies formed in a box-like configuration have commonly spread. Cameras with such a configuration are normally greater in external dimensions and weight than compact cameras utilizing a roll of film with a width of 35 mm which have commonly spread.

Therefore, a common mode for using such a camera to take a picture is to use it with the camera body mounted to a tripod or the like. However, hand-held shooting may be carried out using a camera with such a configuration in consideration to environmental conditions under which the picture is taken, what the photographer intends to express and the like.

In such a case, the photographer holds the camera by supporting the bottom surface of the camera body with both of his or her own hands as described above.

When a picture is taken, in general, operations to make various settings are required depending on the environment of the scene to be photographed, the state of the object and the like.

In the case of hand-held shooting in which the photographer supports the bottom surface of the camera body with both of his or her own hands, the operations to make various settings and the like are carried out using one of the hands supporting the camera body though only temporarily. In such a case, the support of the camera undesirably becomes unstable.

Under such circumstances, conventional cameras commonly used are subjected to a so-called slip-proofing process such as applying a sheet-like member having, for example, a rubber coating or an irregular pattern thereon to a predetermined portion of the outer surface of a camera body which is in contact with the hands supporting the camera.

However, even when means such as slip-proofing process as described above is provided, it is quite difficult to securely support the body of a camera having a configuration as described above during hand-held shooting when the shape, size and weight and the like are taken into consideration.

In order to allow a camera body to be securely held, grip means constituted by a unit formed by integrating, for example, an automatic film feeder, a power supply battery, etc. may be attached to the camera body. This allows a photographer to securely hold the camera even during hand-held shooting by gripping grip portions provided at the grip means with his or her own hands.

However, when a camera body having such grip means is held, a photographer normally supports the camera, for example, by gripping edges on both sides thereof instead of supporting the bottom surface of the camera body with his or her own hands as described above.

In the case of conventional cameras for taking a picture by exposing a desired image of an object on a photographic film and electronic cameras which convert a desired image of an object into an electrical image signal using a pickup device or the like and record the signal as an electric signal in a predetermined form (hereinafter both types of cameras are collectively simply referred to as "cameras"), an exposure operation is normally performed after manually or automatically performing an operation of making exposure-related settings such as a stop value and a shutter speed depending on the object to be photographed and the photographic environment around the object and after setting a diaphragm, a shutter device and the like based on the setting to adjust the quantity of incident beams of light from the object.

When a manual exposure adjusting operation is performed at this time, the user of the camera or the like performs the exposure operation by setting a desired stop value, shutter speed and the like so as to provide an optimum exposure value in accordance with the scene and the object to be photographed.

After the exposure operation is performed with such an exposure value (a combination of a stop value and a shutter speed) which seems optimum, the exposure operation may be continued on the same object with exposure values obtained by, for example, changing the setting of the stop value or shutter at predetermined intervals using a predetermined exposure value regarded optimum as a reference which is different from the above exposure value. That is, the exposure operation may be performed plural times on the same object with exposure values reached by intentionally shifting the exposure value from the reference exposure value in several steps.

A plurality of images thus acquired are compared and observed after photographing them to allow the user of the camera to perform operations such as selecting the image which seems to be the best representation of the photographic intention of him or herself.

Further, skilled photographers may sometimes determine, in advance, to set a predetermined stop value, a predetermined shutter speed or the like depending on considerations on the object to be photographed such as a particular object to be photographed and what the photographers intend to express.

However, let us assume here that an object is to be photographed again with an initial exposure value after performing exposure operations with the exposure value shifted in several steps as described above in the same photographic environment or that an exposure value is to be reset to a value determined by the photographer in advance after a series of photographic operations. Then, a manual resetting operation at each of such occasions will adversely affect the operability of the camera or the like and will reduce efficiency of the photographic operation. Further, since the resetting operation may take a long time, a problem can arise in that the best timing for shooting can be missed.

Under such circumstances, various means have been conceived to make it possible to store a desired set value in advance and to easily reset such a value by arbitrarily retrieving the desired set value as needed.

For example, one possible means is to provide a plurality of operation members such as a setting operation member for setting a desired stop value, a storage operation member for storing a desired set value among set values which can be set using the setting operation member and a retrieval operation member for retrieving the set value stored by the storage operation member and for resetting the same value. In this approach, a desired value is set with the setting operation member; the desired set value is thereafter stored in advance by operating the storage operation member; and the retrieval operation member is operated as needed during execution of a normal photographic operation to reset the value stored in advance instead of a value set by the setting operation member at that point in time.

In order to ensure such a function, however, a plurality of operation members may be required for respective operations. Therefore, such means can make operations complicated, resulting in a problem in that operability and ease of use is reduced.

The present invention has been made taking the above-described points into consideration.

SUMMARY OF THE INVENTION

It is a first object of the invention to provide a camera configured to be supported by the hands of a photographer on the bottom surface of the body thereof whose body can be reliably supported during hand-held shooting or the like using the same and in which photographic conditions and the like can be easily set to contribute to improvement of operability.

It is a second object of the invention to provide a camera having a function of allowing a desired set value to be stored in advance and allowing the set value stored in advance to be retrieved and reset as needed in which the function of storing a set value and retrieving and resetting the same can be achieved with fewer operation members.

Briefly, according to a first aspect of the invention, there is provided a camera configured to be supported by the hands of a photographer on the bottom surface of the body thereof, characterized in that it has a grip portion protruding in a direction orthogonal to an optical axis of a photographic optical system provided in a predetermined position of a lateral surface of the body of the camera and operating means for allowing input of information to cause execution of a predetermined operation and in that the operating means is provided in the vicinity of the grip portion.

According to a second aspect of the invention, there is provided a configuration characterized in that it includes setting means for setting a desired set value, set value storing means for storing data representing desired set values which can be set with the setting means in advance, set value retrieving means for arbitrarily reading the data stored in advance with the set value storing means instead of the set value set with the setting means and for setting a set value based on the same and control means for controlling the set value storing means and the set value retrieving means such that they can be operated with single operating means.

The above and other objects and advantages of the invention will become more apparent from the following detailed description.

The invention makes it possible to provide a camera configured to be supported by the hands of a photographer on the bottom surface of the body thereof whose body can be reliably supported during hand-held shooting or the like using the same and in which photographic conditions and the like can be easily set to contribute to improvement of operability.

The invention also makes it possible to provide a camera having a function of allowing a desired set value to be stored in advance and allowing the set value stored in advance to be retrieved and reset as needed in which the function of storing a set value and retrieving and resetting the same can be achieved with fewer operation members.

BRIEF DESCRIPTION OF THE DRAWINGS

FIG. 2 is a side view of the camera in FIG. 1 showing an arrangement of a grip portion, each of operation members and the like.

DETAILED DESCRIPTION OF THE PREFERRED EMBODIMENTS

An embodiment of the invention will be described with reference to an electronic camera which converts a desired image of an object into an electrical image signal using a pickup device or the like and records the signal as an electric signal in a predetermined form, as an example of a camera to which the invention is applied.

Figure 1:
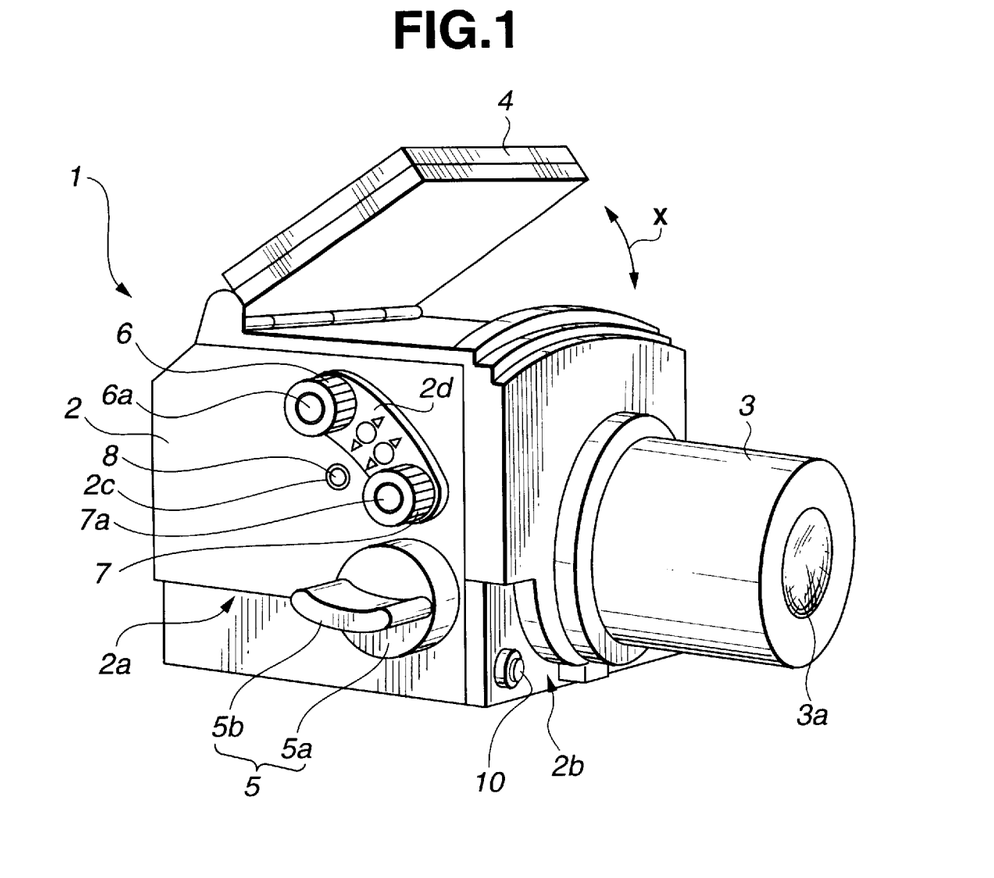
FIG. 1 is an external perspective view of a camera according to an embodiment of the invention.
Figure 2:
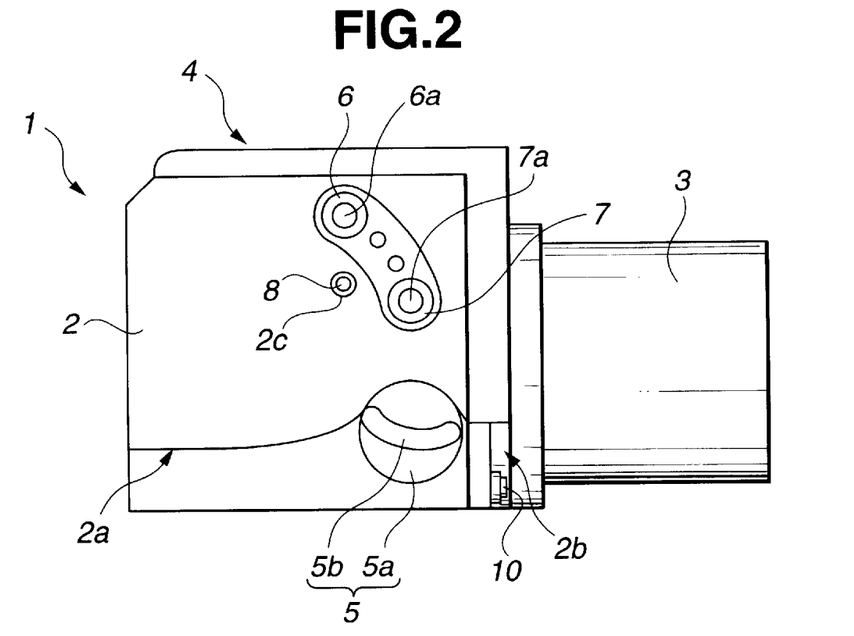

FIG. 1 is an external perspective view of the camera of the embodiment, and FIG. 2 is a side view of the camera showing an arrangement of a grip portion, each of operation members and the like.

As shown in FIGS. 1 and 2, a camera 1 of the present embodiment is formed by a camera body 2 having a box-like configuration, a photographic lens barrel 3 having a substantially cylindrical configuration provided on a front surface of the camera body 2, a display 4 pivoted on an upper surface of the camera body 2 at one end thereof such that it can be rotated in the direction indicated by the arrow X, etc.

As described above, the photographic lens barrel 3 is detachably provided on the front surface of the camera body 2 using predetermined mounting means such that it protrudes therefrom. A photographic optical system 3a formed by a plurality of lenses (hereinafter simply referred to as "lenses"), a diaphragm, a shutter device (not shown), etc. are provided in predetermined positions in the photographic lens barrel 3.

A front step portion 2b is provided in a predetermined position on the front surface of the camera body 2 near one side and bottom thereof. On the front step portion 2b, a release button 10 is disposed which is a second operation member for generating instruction signals for starting the execution of predetermined operations that accompany a photographic operation, e.g., a photometric operation and a distance measuring operation and for generating an instruction signal or the like for starting (permitting) the execution of an exposure operation. The release button 10 is constituted by, for example, a push-type part, i.e., a so-called push button which is pushed in a direction in parallel with the optical axis of the lenses 3a.

A grip portion 5 is formed integrally with the camera body 2 on one lateral surface of the camera body 2 in a predetermined position near the front side such that it outwardly protrudes in a direction orthogonal to the optical axis of the lenses 3a. The grip portion 5 is formed by a cylindrical base portion 5a and a finger rest portion 5b having a substantially rectangular section which is integrally secured to a substantially central region of the base portion 5a and which is rounded at each of the corners thereof.

On the same side of the camera body 2 where the grip portion 5 is disposed, a lateral step portion 2a is formed which is located in a region below a boundary defined by a line including a predetermined curve extending along the outline of the upper half of the base portion 5a of the grip portion 5 and extending toward the rear side of the camera body 2.

Further, a plurality of operation members which are first operating means, i.e., various operation members and the like for making various settings, changes and the like associated with exposure are provided on the same side of the camera body 2 where the grip portion 5 is disposed in a predetermined position in the vicinity of the grip portion 5 and near the upper edge of the camera body 2.

For example, the plurality of operation members that constitute the first operating means may be a plurality of operation members associated with the setting of a stop value, a plurality of operation members associated with the setting of a shutter speed, and the like.

Figure 5:
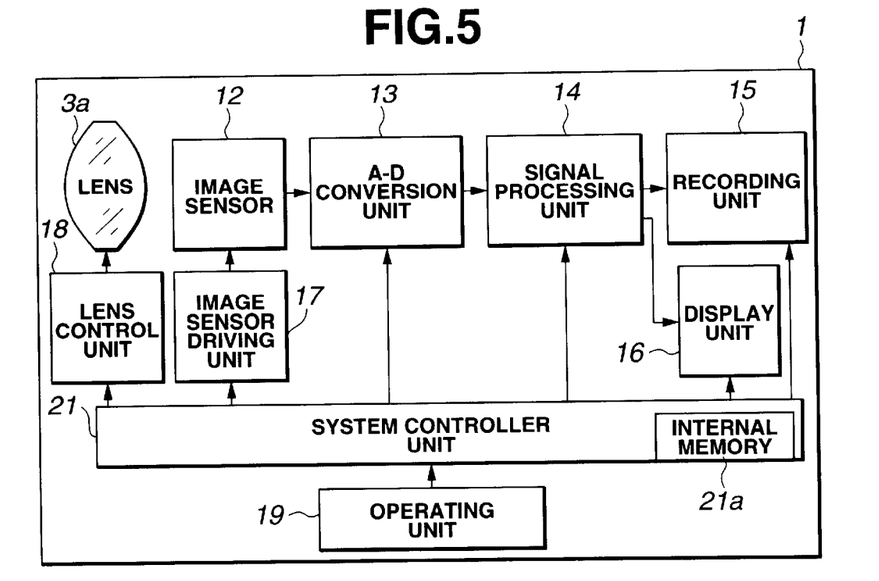
FIG. 5 is a block configuration diagram of the camera in FIG. 1 showing an internal configuration thereof.

The plurality of operation members associated with the setting of a stop value may include a stop setting dial 6 constituted by a rotary operation member which is stop value setting means rotatably pivoted on the camera body 2 and rotated for setting a desired stop value or changing the same and a preset stop value storing/retrieving button 6a constituted by a push operation member provided coaxially with an axis of rotation of the stop setting dial 6, having stop value storing means as set value storing means which is operated in a predetermined manner to store data representing desired stop values settable with the stop setting dial 6 in a predetermined area of predetermined storage means provided in the camera 1, e.g., an internal memory 21a of a system controller unit 21 (which is not shown in FIG. 1 and for which FIG. 5 is to be referred to) in advance and having stop value retrieving means as set value retrieving means which is operated in a predetermined manner to read the data stored by the stop value storing means in the internal memory 21a in advance and to set a stop value based on the data instead of a stop value set with the stop setting dial 6.

That is, the preset stop value storing/retrieving button 6a in the camera 1 of the present embodiment is constituted by a single operation member formed by stop value storing means and stop value retrieving means which are integral with each other.

In such a configuration, therefore, the preset stop value storing/retrieving button 6a serves as stop value storing means when operated in a predetermined manner and serves as stop value retrieving means when operated in another predetermined manner (a detailed description will follow).

Similarly to the above-described plurality of operation members associated with the setting of a stop value, the plurality of operation members associated with the setting of a shutter speed may include a shutter speed setting dial 7 constituted by a rotary operation member which is shutter speed setting means rotatably pivoted on the camera body 2 and rotated for setting a desired shutter speed or changing the same and a preset shutter speed storing/retrieving button 7a constituted by a push operation member provided coaxially with an axis of rotation of the shutter speed setting dial 7, having shutter speed storing means as set value storing means which is operated in a predetermined manner to store data representing desired shutter speeds settable with the shutter speed setting dial 7 in a predetermined area of predetermined storage means provided in the camera 1, e.g., the internal memory 21a of the system controller unit 21 (see FIG. 5) in advance and having shutter speed retrieving means as set value retrieving means which is operated in another predetermined manner to arbitrarily read the data stored by the shutter speed storing means in the internal memory 21a in advance and to set a shutter speed based on the data instead of a shutter speed set with the shutter speed setting dial 7.

That is, similarly to the above-described preset stop value storing/retrieving button 6a, the preset shutter speed storing/retrieving button 7a in the camera 1 of the present embodiment is constituted by a single operation member formed by shutter speed storing means and shutter speed retrieving means which are integral with each other.

In such a configuration, therefore, the preset shutter speed storing/retrieving button 7a serves as shutter speed storing means when operated in a predetermined manner and serves as shutter speed retrieving means when operated in another predetermined manner (a detailed description will follow).

A bracket button 8 which is an operation member for giving an instruction to perform a plurality of exposure operations automatically and continuously with exposure values shifted stepwise from a reference value based on the result of a photometric operation of photometry means (not shown) is provided in the vicinity of the above-described stop setting dial 6, shutter speed setting dial 7, preset stop value storing/retrieving button 6a, preset shutter speed storing/retrieving button 7a, etc.

The bracket button 8 is located in a recess 2c provided on the lateral surface of the camera body 2, and an operating surface of the button 8 is substantially flush with the lateral surface of the camera body 2. This prevents the bracket button 8 from being inadvertently operated.

Figure 3:
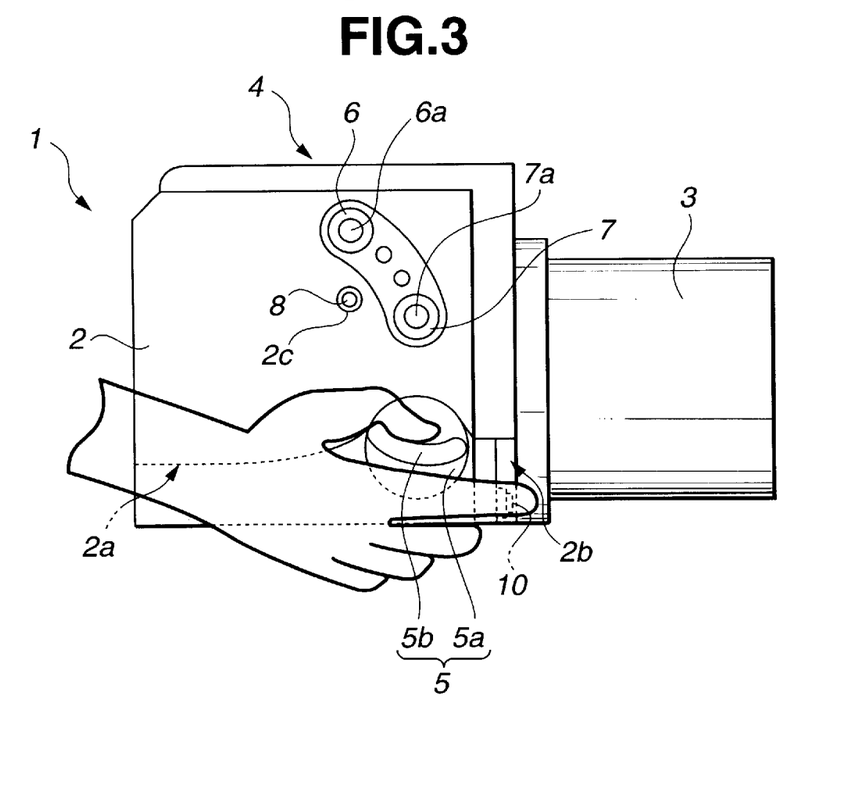
FIG. 3 is an illustration of a state of a hand of a photographer when a picture is taken with the camera in FIG. 1 held in his or her hand, as viewed on the same side as shown in FIG. 2.

A groove or projection 2d is provided around the above-described stop setting dial 6, shutter speed setting dial 7, preset stop value storing/retrieving button 6a and preset shutter speed storing/retrieving button 7a to allow those operation members to be located without visually looking for them (this part is omitted in FIGS. 2 and 3).

A photographer will use the camera 1 of the present embodiment having such a configuration held is his or her hand as described below.

FIG. 3 is an illustration of a state of a hand of a photographer when a picture is taken with the camera held in his or her hands, as viewed on the same side as shown in FIG. 2.

In the state shown in FIG. 3, the photographer supports the bottom surface of the camera body 2 with three fingers, i.e., the small finger, medical finger and middle finger among the fingers of one of his or her hands. The index finger is located in a position where it can operate the release button 10 which is the second operation means disposed at the front step portion 2b of the camera body 2, and the thumb is rested on the finger rest portion 5b of the grip portion 5. Although not shown in FIG. 3, for example, the four fingers of the other hand except the thumb support the bottom surface of the camera body 2, and the thumb is located on the other lateral surface of the camera body 2.

That is, in this state wherein the release button 10 is operated, the bottom surface of the camera body 2 is supported by three or four fingers of both hands except the thumbs; the thumb of one of the hands is rested on the finger rest portion 5b of the grip portion 5 to hold it from above; and the finger rest portion 5b is sandwiched by the bases of the index finger and thumb. Therefore, in this state, the release button 10 can be operated with the index finger of one hand with the camera body 2 held reliably with stability higher than that in the absence of the grip portion 5.

The release button 10 is disposed at the front step portion 2b for the following reason. When the release button 10 is provided at the front step portion 2b, the release button 10 is located in a position close to the index finger, which is advantageous in that the operability of the release button 10 is improved.

In addition, a photographer normally watches the display portion of the display 4 of the camera 1, i.e., an image to be photographed during photographic operations including an operation on the release button 10 and tends to hesitate to look aside away the image. By feeling the front step portion 2b with a finger in a relatively small range, the position of the release button 10 can be easily identified without visually looking for it.

The lateral step portion 2a is formed such that it conforms to a hand of a photographer in the state shown in FIG. 3. By providing such a lateral step portion 2a, the camera body 2 can be held in a more stable state during hand-held shooting.

When a picture is taken using the camera 1, an exposure operation started by operating the release button 10 is preceded by various operations, for example, for setting the stop value and shutter speed at desired values.

In this case, a predetermined finger, i.e., the thumb is moved from the finger rest portion 5b from the state shown in FIG. 3 to operate each of the plurality of operation members of the first operating means.

Specifically, the plurality of operation members of the first operating means, i.e., the stop setting dial 6, shutter speed setting dial 7, preset stop value storing/retrieving button 6a and present shutter speed storing/retrieving button 7a are all located in positions where they can be operated with the thumb, provided substantially in the form of an arc about the base of the thumb to operate them, and arranged along the locus of the movement of the thumb. The bracket button 8 is also provided in a position where it can be operated with the thumb.

It is therefore possible to easily perform desired operations prior to an exposure operation by moving only the thumb with the camera body 2 supported by the fingers except the thumb. At this time, it is not essential to rest the index finger on the release button 10 as shown in FIG. 3, and it may support the bottom surface of the camera body 2.

Thus, the plurality of operation members of the first operating means are provided in positions where they can be operated with a predetermined finger (thumb) to operate the operation members, and the grip portion 5 is disposed in a position such that a predetermined finger (thumb) different from the finger (index finger) to operate the release button 10 can be rested on the finger rest portion 5b of the grip portion 5 when the second operating means (release button 10) is operated, i.e., when an exposure operation is started. This allows the camera body 2 to be kept in a stable state.

In the camera 1 of the present embodiment, the grip portion 5 is thus disposed on a lateral surface of the camera body 2, and the grip portion 5 is held by a predetermined finger (thumb) to allow the camera body 2 to be kept in a stable state when an exposure operation is performed during hand-held shooting, which contributes to reduction of camera shake caused by hands.

At this time, since the predetermined finger (thumb) is rested on the finger rest portion 5b of the grip portion 5, there is no concern about contact between the predetermined finger (thumb) and the various operation members. It is therefore possible to prevent accidents such as an unintended change of a set value or the like from a desired setting due to causes such as inadvertent contact with an operation member during an exposure operation.

Further, each of the plurality of operation members of the first operating means is provided in an arrangement in which it can be operated only with a predetermined finger (thumb), and various operations can be carried out only by moving the thumb without changing the hand to support the camera body 2 during the desired operations, which can contribute to improvement of operability.

As described above, a photographer watches, for example, the display portion of the display 4 of the camera 1, i.e., an image to be photographed during a picture-taking operation and tends to hesitate to look aside away the same. Especially, predetermined photometry means, distance measuring means and the like are disposed in recent cameras and the like, and photographic information including results of the photometric operation and distance measurement is normally displayed along with the observed image on a finder portion, the display portion of a display or the like.

Therefore, when an exposure value setting operation or the like is performed prior to an exposure operation, an efficient photographic operation can be hindered when the eyes are similarly taken away from the display of the display 4. When this point is taken into consideration, it is desirable that the positions of the plurality of operation members of the first operating means can be easily identified without looking at them.

While the groove or projection 2d is provided around the first operating means in the above-described embodiment, operability is further improved in a modification as described below by disposing an index to allow identification of each operating member and a guide portion for guiding a predetermined finger (thumb) to operate the first operating means to the position of a predetermined operation member in the vicinity of the first operating means.

Figure 4:
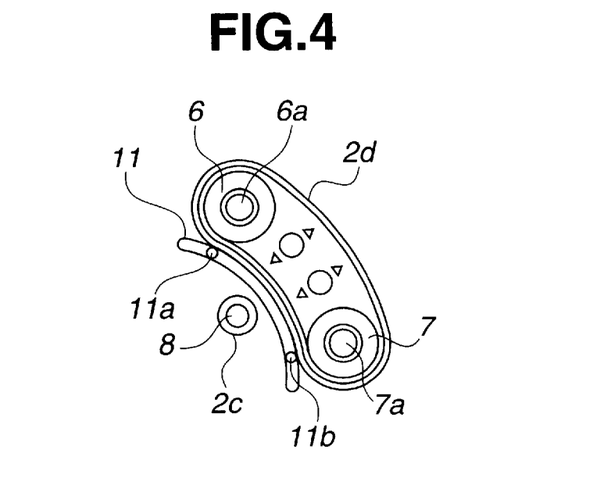
FIG. 4 is an enlarged view of a major part of a modification of the camera in FIG. 1 showing a first operation member and indices and a guide portion provided in the vicinity thereof in an enlarged form.

FIG. 4 is an enlarged view of a major part of a modification of the camera of the above-described embodiment showing only a first operation member and indices and a guide portion provided in the vicinity thereof in an enlarged form.

As shown in FIG. 4, in this modification, a plurality of operation members that constitute first operating means, i.e., a stop setting dial 6, a shutter speed setting dial 7, a preset stop value storing/retrieving button 6a and a preset shutter speed storing/retrieving button 7a are arranged substantially in the form of an arc, quite similarly to the above-described embodiment. A bracket button 8 is also provided in a similar position.

In this modification, a guide portion 11 is provided which is constituted by a groove or projection continuously extending along a groove or projection 2d as described above in the vicinity of the first operating means.

The guide portion 11 is formed with indices 11a and 11b constituted by projections, recesses or the like in the vicinity of respective operation members, i.e., the stop value setting dial 6 and shutter speed setting dial 7.

With the guide portion 11 and indices 11a and 11b thus provided, a thumb reaches a position where it can operate a desired operation member, for example, when it is moved in contact with the guide portion 11 and is extended upon recognition of the index 11a or 11b provided in a predetermined position. It is therefore possible to identify the position of a desired operation member reliably and easily without visually looking for them.

When each of the indices 11a and 11b is formed in a unique configuration that can indicate the respective operation member, identification of each operation member becomes simpler. In this case, for example, the index 11a provided in the position associated with the stop value setting dial 6 may be formed in a convex configuration, and the index 11b provided in the position associated with the shutter speed setting dial 7 may be formed in a concave configuration. Obviously, what is required is to provide indices in configurations that allow respective operation members to be uniquely identified. Therefore, the invention is not limited to this example and, for example, identification may be allowed by providing each index with a different shape (such as a triangular, circular or square shape) or providing the convex and concave portions in different quantities.

When a picture-taking and exposing operation is performed using a normal electronic camera or the like, the photographer using the camera must set various values in advance in order to cause an operation in accordance with his or her intention. In doing so, each of such set values is frequently set at a different value at each photographic operation.

The camera 1 of the present embodiment is configured with a function of allowing desired set values to be stored in advance and allowing a set value stored in advance to be arbitrarily retrieved as needed to allow easy resetting. The following description will refer to an example in which the invention is applied to setting of a stop value or a shutter speed that represent an exposure value among various set values to be set in the camera 1.

FIG. 5 is a block configuration diagram schematically showing an internal configuration of the camera. The internal configuration of the camera 1 will be described below with reference to FIG. 5.

The camera 1 is controlled by each of various electrical circuits, and the various electrical circuits are under general control of the system controller unit 21 which is control means constituted by a CPU or the like.

The interior of the camera 1 is configured by an image sensor 12 constituted by a pickup device such as a CCD which is pickup means for receiving an image of an object formed by beams of light from the object transmitted by a lens 3a as a photographic optical system and for performing a photoelectric conversion process on the same to generate an electrical image signal, an image sensor driving unit 17 for driving and controlling the image sensor 12, an A-D conversion unit 13 for converting the image signal (analog signal) photoelectrically converted by the image sensor 12 into a digital signal, a signal processing unit 14 for receiving the image signal digitized by the A-D conversion unit 13 and for performing predetermined signal processing thereon, e.g., converting the signal into a video signal or the like in the optimum form for representing the image on a display screen of a display unit 16 such as a liquid crystal display (LCD) which is an image display, a display unit 16 for displaying the video signal or the like converted and output by the signal processing unit 14 as an image, a recording unit 15 for recording an image data file generated as a result of predetermined compressed signal processing or the like at the signal processing unit 14, a lens control unit 18 for driving and controlling the lens 3a, a diaphragm and a shutter device (not shown), a plurality of input switches for inputting various instruction signals to the system controller unit 21, an operating unit 19 constituted by various operation members or the like for actuating those input switches, etc.

For example, the operation members that constitute the operating unit 19 correspond to the above-described stop setting dial 6, preset stop value storing/retrieving button 6a, shutter speed setting dial 7, preset shutter speed storing/retrieving button 7a and electrical switches and the like associated with those operation members.

The system controller unit 21 is configured with an internal memory 21a, and data representing desired stop values, shutter speeds and the like which can be set with the stop setting dial 6, shutter speed setting dial 7 and the like as described above can be stored in a predetermined area of the internal memory 21a.

Figure 6:
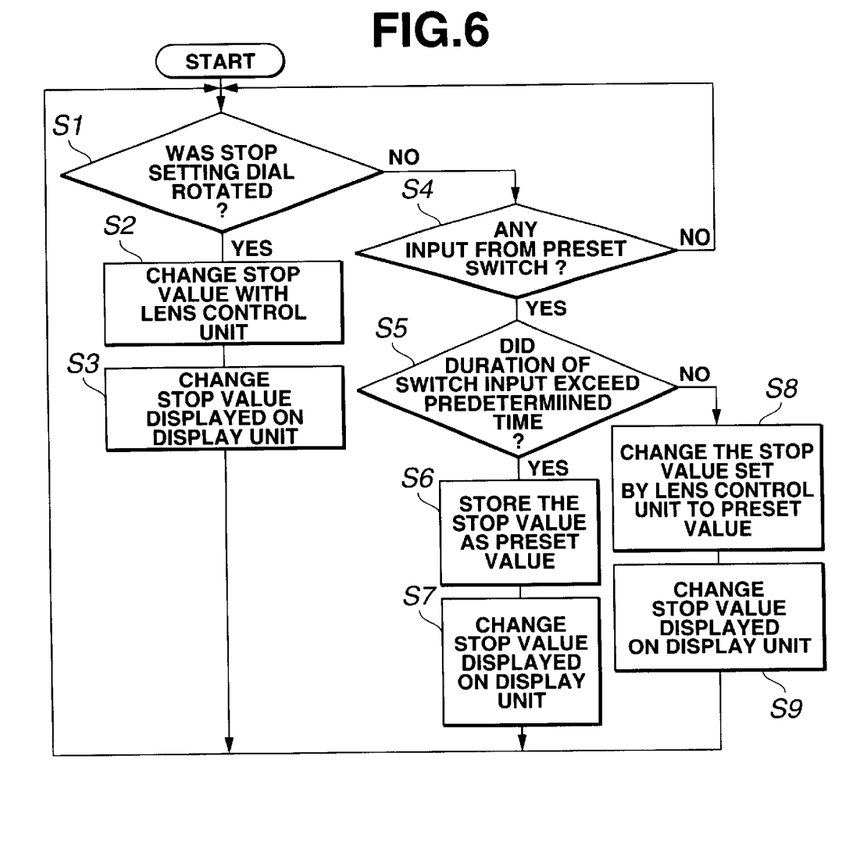
FIG. 6 is a flow chart showing operations of the camera in FIG. 1.

Operations of the camera of the above-described embodiment having such a configuration will now be described with reference to the flow chart in FIG. 6. FIG. 6 illustrates a flow of operations of setting a desired stop value prior to a picture-taking operation using the camera 1, storing the set stop value, reading the stored set value and resetting the read stop value. The series of operations not only relates to the setting of a stop value but also substantially similarly applies to the setting of a shutter speed. Therefore, the following description will refer to only operations associated with a stop value, and operations associated with a shutter speed will not be described.

When the series of operations of the camera 1 is started, a predetermined operation to turn on a main power supply of the camera 1 is performed to enable the camera 1 for picture-taking, i.e. to put it in a standby state for picture-taking. At this time set values such as the stop value and shutter speed are initialized to predetermined initial values.

In this standby state for picture-taking, the system controller unit 21 monitors the state of the stop setting dial 6, preset stop value storing/retrieving button 6a, etc.

First, when the user of the camera 1 rotates the stop setting dial 6 to perform the operation of setting a desired stop value at step S1, a predetermined instruction signal is generated by the stop setting dial 6 (which is included in the operating unit 19). When this instruction signal is detected, the system controller unit 21 sets a stop value in accordance with the direction and quantity of the rotation of the stop setting dial 6 at the next step S2 and drives and controls the diaphragm and the like through the lens control unit 18 based on the stop value. As a result, the stop state of the diaphragm changes to a state in accordance with the desired stop value thus set.

Subsequently, the system controller unit 21 transmits information (data) associated with the set stop value to the signal processing unit 14 at step S3. Upon receipt of the same, the signal processing unit 14 performs signal processing to allow the stop value to be displayed in a visually recognizable form, e.g., in the form of a numerical value in an overlapping relationship with an image displayed on the display unit 16, and the signal thus generated is transmitted to the display unit 16. As a result, the display of a stop value in a predetermined region of the display unit 16 in an overlapping relationship with the displayed image is changed to a numerical value or the like indicating the desired stop value set at the above-described step S1. Then, the above-described step S1 is entered again to repeat the processes following the same step.

At the above-described step S1, a predetermined instruction signal generated by rotating the stop value setting dial 6 is monitored. At this time, if no change occurs in the state of the stop setting dial 6 for a predetermined time, the process proceeds to step S4 at which the system controller unit 21 monitors the state of a preset switch operating in conjunction with the preset stop value storing/retrieving button 6a (included in the operating unit 19). The process proceeds to step S5 if an input signal from the same switch is detected and returns to the above-described step S1 if no input signal from the same switch is detected as a result of monitoring for a predetermined time to repeat the processes following the same step.

At step S5, the system controller unit 21 determines whether the duration of the input from the preset switch at the above-described step S4 is longer than a predetermined time or not, i.e., whether the preset stop value storing/retrieving button 6a is continuously pushed for a time longer than a predetermined time which is set in advance. The process proceeds to step S6 when it is determined that the duration of the preset switch input with the preset stop value storing/retrieving button 6a is longer than the predetermined time and proceeds to step S8 when it is determined that the duration of the preset switch input is shorter than the predetermined time.

At step S6, the system controller unit 21 stores data representing a desired stop value set with the stop setting dial 6 at this point in time in its own internal memory 21a. A stop value represented by data thus stored in the internal memory 21a is referred to as "preset stop value".

Subsequently, at step S7, the system controller unit 21 controls the signal processing unit 14 and display unit 16 to change the mode of display of the stop value displayed in the predetermined region on the display screen of the display unit 16 to a mode of display representing the preset stop value.

For example, the change of the display mode proceeds as follows. A numerical value or the like representing the currently set stop value is normally displayed in white characters or the like on the display unit 16, and the display mode including the display color is changed, e.g., the color of the displayed stop value is changed to red or the like when a preset stop is set at the above-described step S6, i.e., when the operation of storing a set stop value is performed.

As a result, a clear indication is provided on the fact that (data of) the currently set stop value has been stored in the internal memory 21a of the system controller unit 21 as (data of) a preset stop value, which allows the user of the camera 1 to easily confirm the fact only by looking at the indication. When such a change in the display mode (display color) occurs, the above-described step S1 is entered again to repeat the processes following the same step.

When it is determined at the above-described step S5 that the duration of the preset switch input is shorter than the predetermined time, the process proceeds to step S8. In this case, it is assumed that the user of the camera 1 has operated the preset stop value storing/retrieving button 6a for a time shorter than the predetermined time.

Therefore, at step S8, the system controller unit 21 reads the data of a preset stop value stored in its own internal memory 21a in advance and controls the diaphragm and the like through the lens control unit 18 based on the data to change the stop state of the diaphragm to a state corresponding to the preset stop value.

Next, at step S9, the system controller unit 21 controls the signal processing unit 14 and display unit 16 to change the display of a stop value in the predetermined region of the display unit 16 to a display indicating the preset stop value set at the above-described step S8. Then, the above-described step S1 is entered again to repeat the processes following the same step.

As described above, in the above-described embodiment, control is performed to make it possible to operate set value storing means for storing a desired set value (a stop value or a shutter speed) set with the stop setting dial 6 or shutter speed setting dial 7 in advance in the internal memory 21a of the system controller unit 21 as a preset (stop or shutter speed) value and set value retrieving means for reading the data stored in the internal memory 21a in advance by the set value storing means and for setting a set value (a stop value, a shutter speed or the like) based on the same, using a single operation member, i.e., the preset stop value storing/retrieving button 6a or preset shutter speed storing/retrieving button 7a. This makes it possible to reduce the number of operation members associated with operations of storing, retrieving and setting a set value.

The preset stop value storing/retrieving button 6a or preset shutter speed storing/retrieving button 7a which are unified into an operation member can be operated as set value storing means or set value retrieving means as in a switching manner by performing a simple operation of pushing them for different times. It is therefore possible to easily perform an operation of storing or retrieving a preset value when needed without reducing operability.

Further, after an operation of storing a set value is performed, the form of the set value displayed on the display unit 16 is changed to clearly indicate the fact that a storing operation has been performed. Therefore, the result of an erroneous operation, e.g., an operation to store a preset value which is performed insufficiently causing an unwanted retrieving operation, can be recognized from a display on the display unit 16. The user can therefore easily recognize that an erroneous operation has been performed, and it is possible to avoid picture-taking with a set value which is unintended by the user by performing a resetting operation at that time.

While the present invention was described in detail with reference to an example of the application of the invention to a camera. In the above-described embodiment, the invention is not limited to such an example and may obviously applied to various type of devices and apparatuses in general in which a desired value is set and a desired operation is carried out based on the set value.

In this invention, it is apparent that working modes different in a wide range can be formed on this basis of this invention without departing from the spirit and scope of the invention. This invention is not restricted by any specific by the appended claims.

What is claimed is:

1. A camera configured to be supported by the hands of a photographer on the bottom surface of the body thereof, comprising:

a grip portion protruding in a direction orthogonal to an optical axis of a photographic optical system provided in a predetermined position of a lateral surface of the body of the camera; and operating means for allowing input of information to cause execution of a predetermined operation, wherein said operating means is provided in the vicinity of said grip portion.

2. A camera according to claim 1, wherein said operating means comprises at least two operating means, i.e., first operating means operated prior to an exposure operation and second operating means operated to permit an exposure operation.

3. A camera according to claim 2, wherein said grip portion is provided in a position where a predetermined finger different from a finger to operate said second operating means can be rested on said grip portion during when said second operating means is operated and wherein said first operating means is provided in a position where it can be operated with said predetermined finger.

4. A camera according to claim 3, wherein said first operating means comprises a plurality of operation members and wherein indices indicating the positions of respective operating members are provided in the vicinity of the plurality of operation members.

5. A camera according to claim 4, wherein each of said indices is formed in a unique form to allow each of said plurality of operation members to be identified.

6. A camera according to claim 4, wherein the plurality of operation members of said first operating means are arranged along the range of movement of said predetermined finger to operate said first operating means.

7. A camera according to claim 6, further comprising a guide portion formed in the vicinity of said first operating means for guiding said predetermined finger to the position where said predetermined finger can operate said first operating means.

8. A camera comprising:

setting means for setting a desired set value;

set value storing means for storing data representing desired set values which can be set with the setting means in advance;

set value retrieving means for arbitrarily reading the data stored in advance with said set value storing means instead of the set value set with said setting means and for setting a set value based on the same; and control means for controlling said set value storing means and said set value retrieving means such that they can be operated with single operating means.

9. A camera according to claim 8, wherein said control means controls said set value storing means such that it stores data representing a set value set by said setting means when said single operating member is continuously operated for a predetermined time and controls said set value retrieving means such that it reads data stored by said set value storing means in advance and sets a set value based on the same when said single operating member is operated for a predetermined time shorter than said predetermined time.

10. A camera according to claim 8, wherein said setting means is stop value setting means for setting a stop value among photographic conditions;

said set value storing means is stop value storing means for storing data representing a desired stop value which can be set with said stop value setting means; and said set value retrieving means is stop value retrieving means for reading the data stored by said stop value storing means in advance and setting a stop value based on the same instead of the stop value set with said stop value setting means.

11. A camera according to claim 8, wherein said setting means is shutter speed setting means for setting a shutter speed among photographic conditions;

said set value storing means is shutter speed storing means for storing data representing a desired shutter speed which can be set with said shutter speed setting means; and said set value retrieving means is shutter speed retrieving means for reading the data stored by said shutter speed storing means in advance and setting a shutter speed based on the same instead of the shutter speed set with said shutter speed setting means.

12. A camera according to claim 8, further comprising display means for displaying the set value set with said setting means, wherein the set value displayed by said display means is displayed with the display mode switched to a different display mode when the operation of storing data representing a desired set value is performed with said set value storing means.

13. A camera according to claim 8, wherein said setting means comprises a rotary operation member provided rotatably and wherein said single operating means comprises a push operation member provided coaxially with an axis of rotation of said rotary operation member.

14. A camera according to claim 9, wherein said setting means is stop value setting means for setting a stop value among photographic conditions;

said set value storing means is stop value storing means for storing data representing a desired stop value which can be set with said stop value setting means; and said set value retrieving means is stop value retrieving means for reading the data stored by said stop value storing means in advance and setting a stop value based on the same instead of the stop value set with said stop value setting means.

15. A camera according to claim 9, wherein said setting means is shutter speed setting means for setting a shutter speed among photographic conditions;

said set value storing means is shutter speed storing means for storing data representing a desired shutter speed which can be set with said shutter speed setting means; and said set value retrieving means is shutter speed retrieving means for reading the data stored by said shutter speed storing means in advance and setting a shutter speed based on the same instead of the shutter speed set with said shutter speed setting means.

16. A camera according to claim 9, further comprising display means for displaying the set value set with said setting means, wherein the set value displayed by said display means is displayed with the display mode switched to a different display mode when the operation of storing data representing a desired set value is performed with said set value storing means.

* * * * *